United States Patent [19]

Stanley et al.

[11] 4,099,255

[45] Jul. 4, 1978

[54] INTERRUPT APPARATUS FOR ENABLING INTERRUPT SERVICE IN RESPONSE TO TIME OUT CONDITIONS

[75] Inventors: Philip E. Stanley, Westboro; William E. Woods, Natick, both of Mass.

[73] Assignee: Honeywell Information Systems Inc., Waltham, Mass.

[21] Appl. No.: 749,572

[22] Filed: Dec. 10, 1976

[51] Int. Cl.² .......................... G06F 1/04; G06F 11/00
[52] U.S. Cl. .................................................. 364/900
[58] Field of Search ... 364/900 MS File, 200 MS File

[56] References Cited

U.S. PATENT DOCUMENTS

| | | | |
|---|---|---|---|
| 3,312,951 | 4/1967 | Hertz | 364/200 |
| 3,426,331 | 2/1969 | Joyce | 364/200 |
| 3,566,368 | 2/1971 | De Blauw | 364/200 |
| 3,723,975 | 3/1973 | Kurtz, Sr. et al. | 364/200 |
| 3,909,795 | 9/1975 | Chang et al. | 364/200 |
| 3,999,169 | 12/1976 | Perschy | 364/200 |

*Primary Examiner*—Gareth D. Shaw
*Assistant Examiner*—Thomas M. Heckler
*Attorney, Agent, or Firm*—John S. Solakian; Nicholas Prasinos; Ronald T. Reiling

[57] ABSTRACT

Interrupt service is enabled for either a real-time clock or watchdog timer time out condition. A mode register is provided to effectively enable or disable the interrupt apparatus and if enabled is coupled to enable a service register in response to repetitively occurring clock pulses. Each time the service register is enabled, a counter is changed in value until a predetermined value is indicated at which time interrupt service is enabled at an interrupt level specified by the operator. Further, facilities are provided for presetting the value of the counter in an expeditious manner.

8 Claims, 4 Drawing Figures

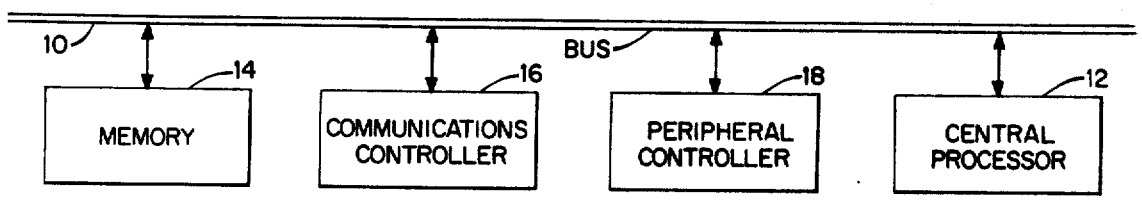
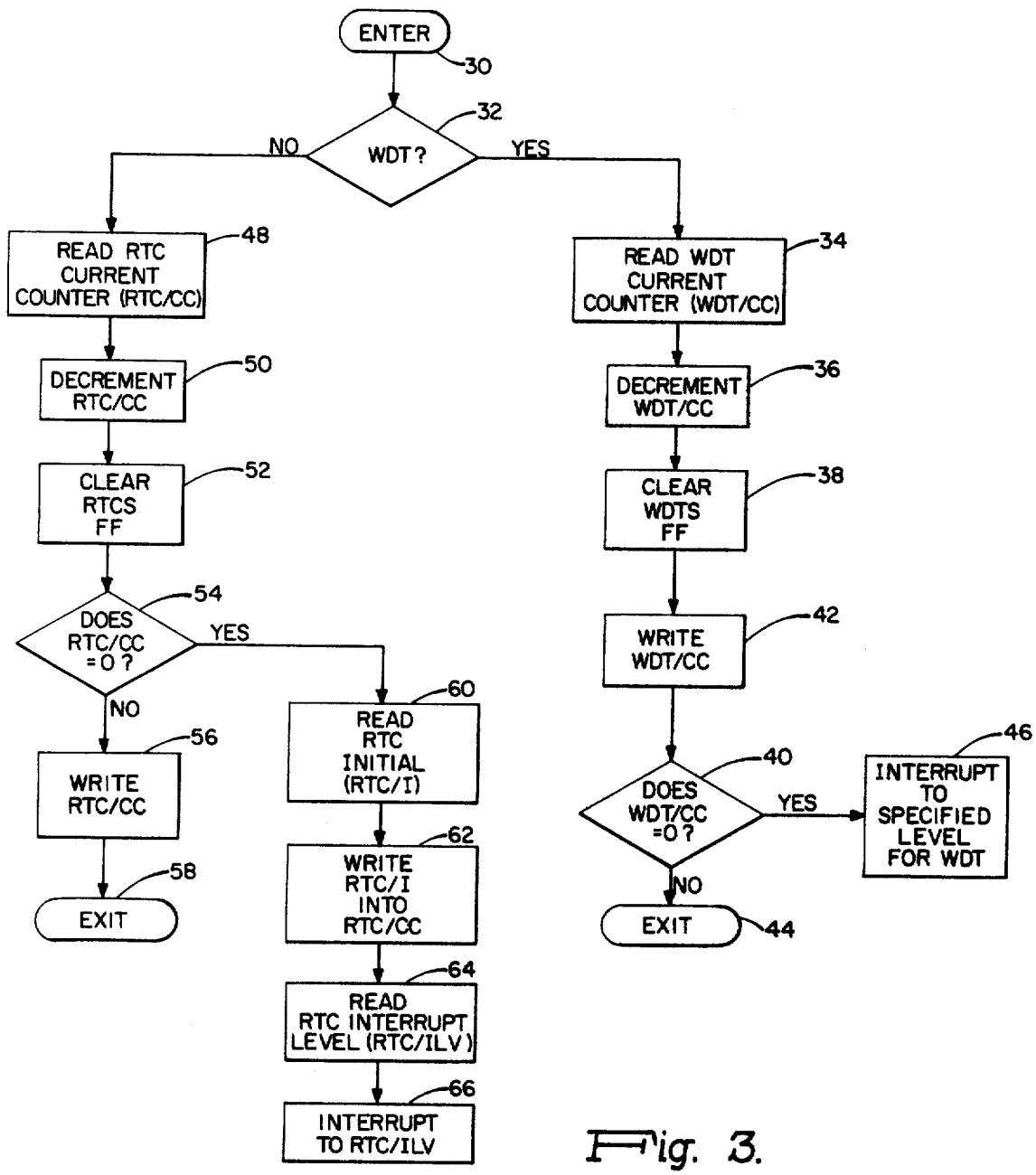

INTERRUPT APPARATUS FOR ENABLING INTERRUPT SERVICE IN RESPONSE TO TIME OUT CONDITIONS

RELATED APPLICATIONS

The following patent and patent applications are incorporated herein by reference:

1. Patent application Ser. No. 591,902, now U.S. Pat. No. 4,030,075
   Filed — June 30, 1975
   Title — DATA PROCESSING SYSTEM HAVING DISTRIBUTED PRIORITY NETWORK
   Inventor — George J. Barlow
2. Patent application Ser. No. 591,964, now U.S. Pat. No. 3,993,981
   Filed — June 30, 1975
   Title — ARCHITECTURE FOR A COMMON BUS COUPLED IN A DATA PROCESSING SYSTEM
   Inventors — Frank V. Cassarino et al.
3. U.S. Pat. No. 3,984,820
   Issued — Oct. 5, 1976
   Title — APPARATUS FOR CHANGING THE INTERRUPT LEVEL OF A PROCESS EXECUTING IN A DATA PROCESSING SYSTEM
4. Patent application Ser. No. 674,698
   Filed — Apr. 7, 1976
   Title — WORD, BYTE AND BIT INDEXED ADDRESSING IN A DATA PROCESSING SYSTEM
   Inventors — William E. Woods et al.
5. Patent application Ser. No. 674,517, now U.S. Pat No. 4,047,247
   Filed — Apr. 7, 1976
   Title — ADDRESS FORMATION IN A MICROPROGRAMMED DATA PROCESSING SYSTEM
   Inventors — Philip E. Stanley et al.

SUMMARY OF THE INVENTION

In accordance with the invention, a data processing system is provided in which there is included a decoder for decoding a signal indicating whether or not interrupts will be enabled. Such signal has either a first state if interrupts are to be enabled or a second state if they are to be disabled. Further included is a mode register and a service register. The mode register is coupled with the decoder and is coupled to store the state of the signal provided by the decoder. Also included is a time-out counter, the value of which may be changed until a predetermined value is indicated, which predetermined value indicates an interrupt service request. The service register is coupled to enable the change in value of the time-out counter if the service register indicates a specified value. Further provided is apparatus which is responsive to a first state of the signal stored in the mode register and which is responsive to a pulse from the stream of pulses generated by a pulse generator, for enabling the service register to so indicate such specified value thereby indicating such interrupt service request. The apparatus of the present invention further provides means by which the time-out counter may be updated in response to such interrupt service request and the manner in which interrupts may be disabled.

BACKGROUND OF THE INVENTION

The present invention relates generally to data processing systems and more particularly to interrupt service enabling apparatus included therein.

In most computer systems, mechanisms are provided for providing an interrupt in response to either a watchdog timer or a real time clock time-out. The watchdog timer is utilized to indicate catastrophic conditions such as a time out without any event taking place in the computer system, whereas the real time clock is utilized to provide time outs in order to command the commencement or termination of a particular event. The interrupts produced by these mechanisms should be serviced in a set priority with respect to any other interrupts which may be included in the system. It is thus important that the interrupt priority or level be set for the particular interrupt in accordance with the importance of such interrupt in the system. Further, it is important that such priority or level be changeable under for example program control in order to easily configure the system. It is also important to be able to, for example with respect to the real time clock which may time-out for various length intervals, preset such intervals in a minimum period of time and without suspending the operation of the system during the update of such time out interval. Further, it is also important for example for debug or initialization purposes, that the real clock and watchdog timer interrupts be inhibited so that the operator may provide such initialization or debugging without constantly facing an interrupt condition. It is also particularly important to implement such interrupt mechanism with minimal logic in the data processing system.

BRIEF DESCRIPTION OF THE DRAWINGS

The features and advantages of the present invention will become more clearly apparent from the following descriptions of arrangements, which are described solely as examples, and which are illustrated in the accompanying drawings in which:

FIG. 1 illustrates the environment of the present invention;

FIG. 3 is a flow diagram of the operation of the present invention; and

DETAILED DESCRIPTION OF THE PREFERRED EMBODIMENTS

Figure 4:
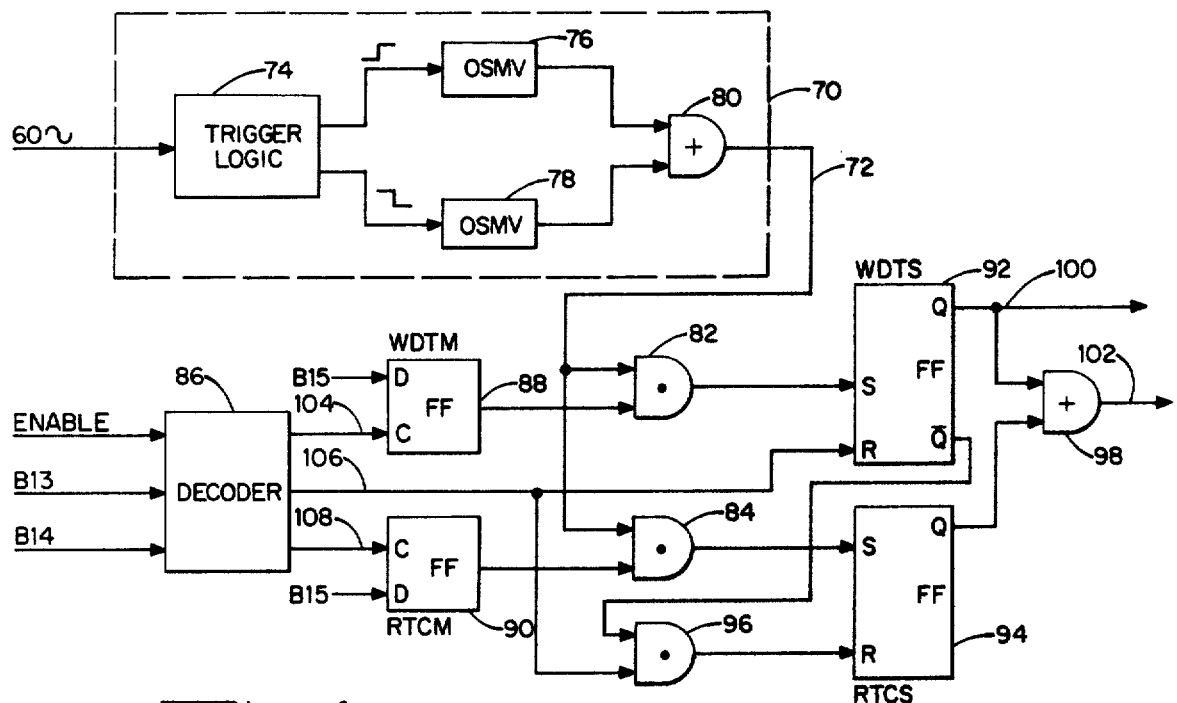
FIG. 4 illustrates logic which is used in the present invention.

The apparatus of the present invention is utilized in the environment set forth in FIG. 1 which includes a common bus 10 coupling various elements including a central processor 12, a memory 14 and various other devices such as a communications controller 16 and a peripheral controller 18. The apparatus of the present invention is basically included in the central processor 12 and the memory 14 as coupled by the bus 10. The manner in which the elements are coupled with bus 10 and accordingly the interface information provided in association therewith is fully described in U.S. patent application Ser. Nos. 591,902 and 591,964, both filed on June 30, 1975. Further, the central processor 12 includes interrupt facilities with which the apparatus of the present invention is associated. The interrupt facilities of central processor 12 are described in U.S. Pat. No. 3,984,820, issued on Oct. 5, 1976.

The real-time clock/watchdog timer (RTC/WDT) facilities of the present invention enable, for the case of real time clock interrupts, interrupt service to take place at any specified level, lower numbered levels having higher priority. Depending upon such interrupt level, the real time clock interrupt may or may not take precedence over other interrupts having different levels. Thus the real time clock may have in effect priority over other types of interrupts or priority to a lesser extent as desired by the system designer. On the other hand the watchdog timer facility of the present invention, although it may take advantage of such interrupt facilities, because of the nature of such watchdog timer, is more expeditiously made to interrupt to a specified level. Because, in effect, the watchdog timer indicates a catastrophic condition, the interrupt level to which it will interrupt will be necessarily higher than most of the other interrupts received in the system.

As is well known, the watchdog timer is utilized in the system to indicate whether or not there has been activity in the system for a given period of time. For example, if there has not been any activity in the system for a given period of time, then in fact an interrupt will take place indicating this more or less catastrophic condition. More particularly, the watchdog timer is decremented or incremented, depending upon the designer's choice, by a pulse derived usually from the AC voltage power line frequency. Such pulses may for example be 8 milliseconds spaced in time. These pulses are counted until a "long" period has elapsed, and if nothing has happened during such rather long period of time, then a watchdog timer interrupt will be generated to a specified level set for watchdog timer interrupt servicing. Thus, the watchdog timer is set to assure that should there be a failure in the system where no operations are taking place, then such interrupt will be created.

Unlike the watchdog timer, the real time clock is utilized to time certain events. For example, the real time clock could be set to give a time out each half second interval and at the end of such interval generate such an interrupt so as to signal that a certain task be commenced. For example, the real time clock may be utilized in a factory automated system or other building control system where it is desired, to read the indication of various transducers in the system. If these transducers are to be read every half second, at the end of each half second interval provided by the real time clock, this task of reading out the indications of the transducers may be commenced. If one simple task is to be performed, then the half second interval for time out by the real time clock may be utilized over and over. On the other hand, if the system is a complex one and various operations are to be commenced at different intervals, for example, such reading of the transducers to take place at half second intervals and various other operations taking place in quarter second intervals and the like, then in fact the real time clock must be programmed or initialized each time so as to insure that the various operations will be commenced at the time desired.

Figure 2:
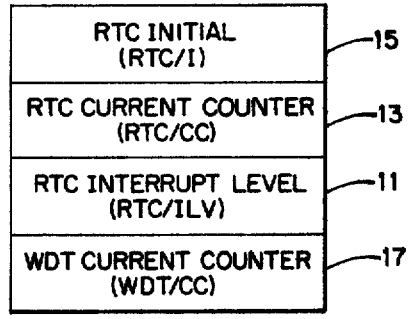
FIG. 2 illustrates the manner in which various counters and other values are stored in a memory associated with the present invention.

Thus, the real-time clock/watchdog timer facilities of the present invention are implemented in accordance with the teachings hereof by providing logic as shall be described with respect to FIG. 4 and memory space in memory 14 as described with respect to FIG. 2. In FIG. 2, it is seen that the real time clock has three dedicated word locations, 11, 13 and 15 for example in memory 14. There is the RTC interrupt level (RTC/ILV) word 11 which is provided for purposes of indicating the interrupt level for the real time clock. This level may be programmed to a different interrupt level depending upon the desired priority of the operation to be performed. In addition, in memory 14 is stored the real time clock current counter (RTC/CC) word 13 which is utilized to keep a count indicative of the time elapsed between events. The RTC Initial (RTC/I) word 15 is utilized to store the next value to be initialized in the RTC Current Counter after the next real time clock interrupt. Word 15 may be loaded during the interval between real time clock interrupts. This has the advantage of relieving any burden in the system requiring processing for determining the next value for the RTC Current Counter before the real time clock is again activated. The WDT Current Counter (WDT/CC) in word 17 is used in a manner similar to the RTC Current Counter. Each of the locations in memory 14 may be addressed and read or written into by means of the apparatus shown in patent applications having Ser. Nos. 674,698 and 674,517, both filed on Apr. 7, 1976.

Now referring to FIG. 3, when the logic of FIG. 4 indicates that the watchdog timer or real time clock is to be serviced, the operation indicated by FIG. 3 is entered at block 30. If the watchdog timer has had its WDTS flip-flop 92 activated, thereby indicating that the watchdog timer is to be incremented, then block 32 produces a Yes answer thereby entering block 34 by which the value of the watchdog timer current counter is read from memory 14. The value of such counter is then decremented as indicated in block 36 and the watchdog timer service flip-flop 92 as shown in FIG. 4 is cleared as indicated in block 38. The value of the watchdog timer current counter as decremented is written back into memory 14 as indicated by block 42. The question is then asked in block 40 as to whether or not the value of the watchdog timer current counter is equal to zero. If the answer is No, then the operation of FIG. 3 is exited at block 44. If the answer to block 40 was Yes, then there would be an interrupt as indicated in block 46 to the specified level for the watchdog timer. At this point the watchdog timer would be serviced by an interrupt service routine for that particular type of interrupt.

If this is not a watchdog timer interrupt as indicated in block 32, then block 48 will be entered by which the real time clock current counter will be read from memory 14 and thereafter decremented as indicated in block 50. At this point, the RTCS flip-flop 94, that is the service flip-flop for the real time clock, will be cleared as indicated in block 52. The question is then asked in block 54 as to whether or not the real time clock current counter is equal to zero. If the answer from block 54 is No, then the value of the real time clock current counter as decremented is written back into memory 14 as indicated in block 56 following which the operation of FIG. 3 is exited as indicated in block 58. If on the other hand the answer to block 54 is Yes, then block 60 is entered by which the real time clock initial value 15 is read from memory 14 and by block 62 is written into the real time clock current counter word 13 in memory 14. Thus, the value of the time out for the next real time clock interrupt is set into the real time clock current counter without delay. Thereafter block 64 is entered by which the real time clock interrupt level 11 is read from memory 14. This level may be set to a different number depending upon the interrupt level desired by the programmer (user) of the system. Following the reading of such level as indicated in block 64, block 66 is entered by which an interrupt is made to the real time clock interrupt level. Following this, real time clock interrupt service is provided by means of an interrupt service routine for such interrupt.

Now referring to FIG. 4, the logic utilized to initiate the operation as shown in FIG. 3 is shown. The timer 70 converts the 60 hertz line frequency into output pulses on line 72, which pulses repeat 120 times per second. Basically the 60 hertz signal is provided to trigger logic 74, such as a schmitt trigger current, which converts the sinewave of the input to a squarewave. Positive going transitions are converted to pulses by means of one-shot multivibrator 76 whereas negative going pulses are also converted to pulses by means of one-shot multivibrator 78. These outputs of both one-shot mutivibrators 76 and 78 are provided to an OR gate 80. The output of gate 80 provides the pulses on line 72. The pulses on line 72 are provided to AND gates 82 and 84 to be hereinafter described.

Decoder 86 is coupled to receive an enable signal and under operator control, by means of a control store or a program executing in connection with the memory 14 and the central processor 12, two signals B13 and B14. Both flip-flops 88 and 90 are coupled to receive a third control signal from the same source as signal B15. Signals B13 and B14 are coupled to provide a decoded signal on line 104 to watchdog timer mode flip-flop 88, another decoder signal on line 108 to real time clock mode flip-flop 90 and on line 106, a decoded signal to the service flip-flop 92. The flip-flops 88 and 90 are mode flip-flops whereas the flip-flops 92 and 94 are service flip-flops. The mode flip-flops are enabled under firmware or software control whereas the service flip-flops are not enabled unless one of the respective mode flip-flops is set and in addition a pulse is received on line 72 via AND gates 82 and 84 respectively. If mode flip-flop 88 has been set, then the enabling of AND gate 82 via a pulse on line 72 will set the service flip-flop 92, whereas if mode flip-flop 90 were set, service flip-flop 94 will be set. Either one of flip-flops 92 or 94 may be set at any particular time in response to a pulse on line 72 or they may be both set at the same time. In order to disable WDT or RTC interrupts, the signal B15 may be held to a binary zero while decoder 86 is caused to generate a pulse on lines 104 and/or 108.

The two outputs of flip-flops 92 and 94 are provided to OR gate 98 so as to provide a test signal on line 102. The Q output of flip-flop 92 is provided on line 100. Such signals on line 100 and 102 are utilized by test logic and in response thereto by next address generation logic as described in U.S. patent application Ser. Nos. 674,698 and 674,517, both filed on Apr. 7, 1976. The test logic senses that either a watchdog timer or real time clock service request has been generated and in response thereto causes the control store addressed by the next address generation logic to branch to a real time clock interrupt service routine but only if an indication on line 100 also received by the test logic indicates that it was not the watchdog timer that caused the request. If the test signal on line 100 indicates that flip-flop 92 has been set and accordingly the watchdog timer produced the request, then the control store will cause the watchdog timer to be serviced first. This is as indicated in block 32 of FIG. 3. After the interrupts are serviced, the operation may clear the service flip-flops 92 and 94. This is done by providing the enabling signals indicated as B13 and B14 so as to provide on line 106 a decoded signal to clear flip-flop 92 directly and via AND gate 96 to clear service flip-flop 94, if in fact the watchdog timer service flip-flop 92 has first been cleared as indicated by a binary ONE at the $\overline{Q}$ output thereof, which output is coupled to one input of AND gate 96.

It can be seen that the watchdog timer or the real time clock can also be selectively turned off so as to inhibit interrupts therefrom. That is, the mode flip-flops 88 and 90 may be effectively cleared by providing a binary ZERO state of the B15 control signal at the D input thereof, which state is stored in such flip-flops when the control signal on lines 104 and 108 respectively are received at the clock input of such flip-flops. Thus, the respective counters stored in memory 14 cannot be decremented unless such mode flip-flops have been set. By way of example, it can be seen that when the system is first initialized or if the operator is attempting to debug the program or system, and it is not desirable to receive a time out interrupt, the operator may disable such mode flip-flops thereby disabling such interrupts.

It has thus been seen that the real time clock/watchdog timer interrupt mechanism of the present invention enables interrupts to the selected level and in the case of the real time clock to a level which may be set under computer program control. Further, it has been seen that the real time clock when it produces an interrupt signal may be quickly updated by means of the real time clock initial word provided in the memory 14. In addition it has been seen that the watchdog timer or real time clock may be effectively inactivated should the operator so desire under for example testing or initialization conditions. It can be seen that other changes may be made to the invention including for example changes in the type of logic or gates used without departing from the scope of the invention.

Accordingly, having described the invention, what is claimed as new and novel and for which it is desired to secure Letters Patent is:

1. In a data processing system, interrupt apparatus comprising:
   A. means for decoding a signal indicating whether or not interrupts will be enabled, said signal, as decoded, having a first state if interrupts are to be enabled and a second state if interrupts are to be disabled;
   B. a mode register, coupled with said means for decoding, for storing the state of said signal as decoded;
   C. means for generating a stream of pulses;
   D. a time-out counter, the value of which may be changed until a predetermined value is indicated, said predetermined value indicative of an interrupt service request;
   E. a service register coupled to enable the changing in value of said counter if said service register indicates a specified value; and
   F. means, responsive to the storage of a first state of said signal in said mode register and responsive to one of said pulses, for enabling said service register to indicate said specified value.

2. A system as in claim 1 wherein said mode register includes first and second bistable means, said first bistable means coupled to indicate whether interrupts indicative of a possible error condition in said system will be enabled, and said second bistable means coupled to indicate whether interrupts indicative of the time out of certain events in said system will be enabled.

3. A system as in claim 2 wherein said means for decoding is coupled to provide said signal to either or both said first and second bistable means.

4. A system as in claim 3 wherein said service register includes first and second bistable elements, said first bistable element coupled to enable an interrupt service request associated with said possible error condition, and said second bistable element coupled to enable an interrupt service request associated with said time out of certain events.

5. A system as in claim 1 further comprising:
A. a memory having a plurality of storage locations, said locations including a first location for storing the value of said counter and a second location for storing another value to be used by said counter following an indication of said predetermined value; and
B. means responsive to the indication of said predetermined value, for enabling the loading of said another value from said second location into said first location.

6. A system as in claim 5 further comprising a third location in said memory for storing a number indicative of the priority of said interrupt service request.

7. A system as in claim 1 further comprising means for disabling said service register after each change in the value of said counter.

8. In a data processing system, a method for enabling interrupt service in response to time out conditions comprising the method steps of:
A. changing the value of a time-out counter at a predetermined rate;
B. determining whether the value of said counter is a predetermined value;
C. repeating said step of changing if said value is not said predetermined value;
D. transferring a predetermined value from a first location in a memory included in said system into said time-out counter, so as to preset said counter for the next time out, if said value in said counter is said predetermined value;
E. determining from another location in said memory the interrupt priority to be given said interrupt service;
F. generating an interrupt service request having the interrupt priority determined from said another location; and
G. disabling said step of changing if interrupts are to be inhibited.

* * * * *